MEANS FOR SUPPORTING FUEL ELEMENTS IN A NUCLEAR REACTOR

Original Filed May 25, 1965 4 Sheets-Sheet 1

INVENTORS
Harry N. Andrews
& Herbert W. Keller
BY A. J. Santantonio
AGENT

MEANS FOR SUPPORTING FUEL ELEMENTS IN A NUCLEAR REACTOR

Original Filed May 25, 1965 4 Sheets-Sheet 2

MEANS FOR SUPPORTING FUEL ELEMENTS IN A NUCLEAR REACTOR

Original Filed May 25, 1965 4 Sheets-Sheet 3

MEANS FOR SUPPORTING FUEL ELEMENTS IN A NUCLEAR REACTOR

Original Filed May 25, 1965 4 Sheets-Sheet 4

United States Patent Office

Re. 28,079
Reissued July 23, 1974

28,079

MEANS FOR SUPPORTING FUEL ELEMENTS IN A NUCLEAR REACTOR

Harry N. Andrews, Murrysville, and Herbert W. Keller, Monroeville, Pa., assignors to Westinghouse Electric Corp., Pittsburgh, Pa.

Original No. 3,379,617, dated Apr. 23, 1968, Ser. No. 458,634, May 25, 1965. Application for reissue June 15, 1971, Ser. No. 153,203

Int. Cl. G21c *3/32*

U.S. Cl. 176—78 30 Claims

Matter enclosed in heavy brackets [ ] appears in the original patent but forms no part of this reissue specification; matter printed in italics indicates the additions made by reissue.

The present invention relates to nuclear reactors and more particularly to means for supporting elements bearing fissionable material or fuel in a nuclear reactor core, but the invention can also be used to support elements in any fluid media.

One general structural form commonly used for providing a nuclear fuel inventory in nuclear reactors is that in which numerous elongated elements or rods containing fissile material are arranged, within a prescribed volume, in a parallel array in an upstanding direction between upper and lower reactor core support plates. To provide integrity in the support relations, the fuel rods are divided into groups and the rods in each group are formed as a fuel assembly prior to placement between the reactor core support plates. A fluid, having coolant and, if desired, neutron moderating properties, flows along and among the fuel rods as a vehicle for energy transfer.

Generally, means are normally provided for laterally supporting the fuel elements for reasons including that of resisting lateral displacement so as to prevent localized neutron flux peaking with resulting "hot spots" or regions of extreme temperature rise in the fuel elements. Therefore, if the "hot spots" can be eliminated, the reactor can be operated closer to its design power limit.

In the past a spring finger type grid design has been utilized to support laterally the fuel rods in a fuel assembly. This design concept provides for individual support of each fuel rod at axially spaced intervals by spring fingers, which position the fuel rods radially within the fuel assembly while permitting thermal expansion with a minimum of constraint. Although the spring finger grid design has proven to be an effective and economical means of providing fuel rod support in the past fuel assembly designs, the problems associated with this design which pose design restrictions are fretting wear, the number of grids required to provide adequate fuel rod support, and the care required during assembly and shipping of the fuel assemblies to prevent damage to the grid spring fingers.

A significant fact contributing to the aforementioned problems is the relatively small resistance to fuel rod lateral motion inherent in current grid designs which, in principle, behave as an unstable spring and mass system because the fuel rods are supported laterally by spring fingers alone. Any forces tending to cause motion of the fuel rod are not resisted (neglecting friction) until deflection of the spring fingers is such as to build up a force to stop the motion. Therefore, before any large resisting force is produced, motion has already commenced. This motion even though it may be only microscopic in magnitude may cause serious fretting under the loads and bearing stresses involved at reactor operating conditions for extended periods of time. Also, the number of grids required to provide adequate fuel rod support has an adverse effect on hydraulic and nuclear core design parameters. Another problem encountered is the extreme care and precautions against shock and accelerations during handling and shipping which are required to prevent damage to the grid spring fingers.

Accordingly, it is the general object of this invention to provide a novel means for supporting fuel elements in a fuel assembly.

Another object of this invention is to provide means for laterally supporting the fuel elements in a fuel assembly while enabling the fuel elements to respond to applied thermal or other forces with axial movement relative to the lateral supporting means.

Still another object of this invention is to provide a grid member which creates a greater resistance to fuel rod motion.

A further object of this invention is to provide an improved grid design which permits a greater unsupported length of fuel rods resulting in fewer grids and material in the fuel assembly.

Another object of this invention is to provide a grid member with greater structural integrity and greater resistance against damage from shock and acceleration forces encountered in normal handling and shipping.

Yet another object of this invention is to provide a grid member having a more stable and rugged spring finger and backup tab design, so that each fuel rod passing through the grid member is forced to assume a location in the center of the grid cell and is not permitted to assume an off-center position obtained by deflecting one spring finger more than another.

Briefly, the present invention accomplishes the above cited objects by providing a more stable spring and mass system as well as a built-in beam effect resulting in a resisting moment. The aforementioned result is accomplished by having two relatively rigid projections engaging the fuel element on one side and a spring means engaging the fuel element directly opposite to the rigid projections. Another set of identical lateral supports are provided for the elongated fuel element at the same longitudinal locations of the fuel element, but rotated approximately 90°. Therefore, a six point lateral support is provided for the fuel element.

More specifically, a nuclear fuel arrangement or assembly comprises a plurality of elongated parallel fuel elements which are supported relative to each other through the use of supporting means including elongated frame means. At least one grid member extends laterally across the frame means and has respective openings through which the fuel elements extend. The openings in the grid member are formed by a plurality of straps, which are interwoven to provide a structural network, similar to an "egg crate." The grid straps, in turn, are provided with rigid and resilient means projecting into each opening for supporting the fuel elements against lateral displacement and, to a given extent, frictionally against longitudinal movement. The rigid means comprises two longitudinally spaced rigid projections which engage the fuel element on one side. The resilient means comprises a spring which engages the fuel element directly opposite to the rigid projections at a longitudinal point preferably midway between the rigid projections. Another identical set of lateral supports are formed in the other two straps which form the opening so as to support the fuel element at the same longitudinal location, but at a lateral location approximately 90° apart from the first set of lateral supports. Thus, a six point lateral support is provided for each fuel element at each opening in the grid member.

Further objects, features and advantages of the invention will become apparent as the following description proceeds wherein features of novelty, which characterize the invention, will be pointed out with particularity.

For a better understanding of the invention, reference may be had to the accompanying drawings, in which.

Figure 1:
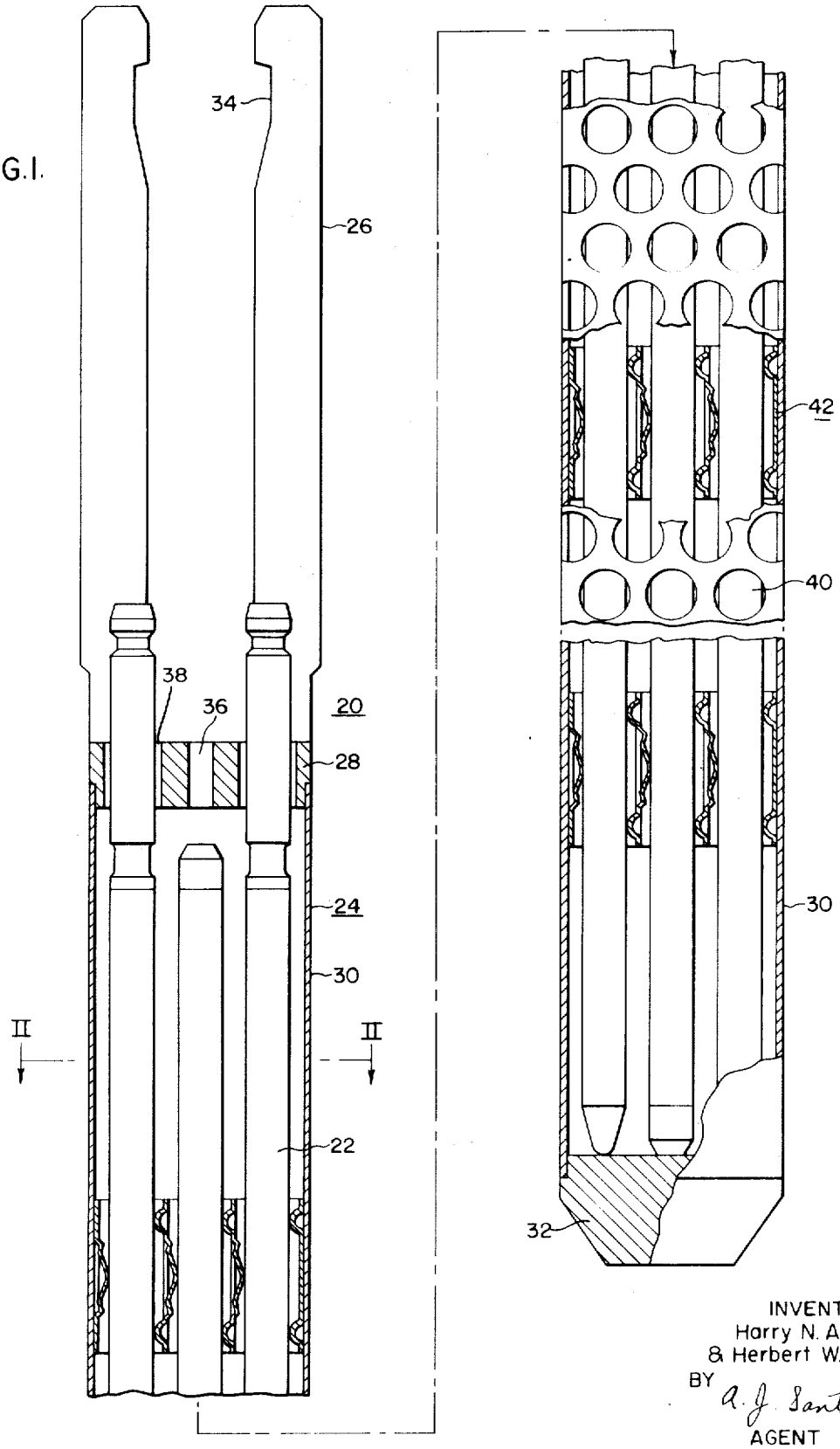
FIGURE 1 is a partially sectioned elevational view of a fuel assembly formed in accordance with the principles of this invention and is taken along reference line I—I of FIG. 2.

Referring now to FIG. 1 there is shown a fuel assembly 20 comprising a plurality of elongated parallel fuel elements 22, which suitably contain a given quantity of fissionable material, and supporting means for the fuel elements 22 including elongated frame means 24 in which the fuel elements 22 are located. In this instance, the frame means or member 24 includes a plurality of arms 26, an upper end plate 28, an enclosure or can 30, and a lower end plate 32. The arms 26 have a recess 34 therein for engagement with a remote handling tool (not shown). The upper end plate 28 is secured to the bottom of the arms 26 and has flow openings 36 and fuel element openings 38. The enclosure 30, in turn, is secured to the upper end plate 28 and the lower end plate 32. The fuel elements 22 merely rest on the lower end plate 32; and, therefore, the fuel elements 22, which extend through the fuel element openings 38, can be removed individually with the fuel assembly 20 remaining in place in the reactor core (not shown). Flow openings 40 are provided in the can 30 so as to permit cross flow of the employed coolant, and the form of the coolant openings 40 is such as to maximize both this flow and structural stiffness. The lower end plate 32 also has flow openings (not shown) in a direction axially parallel to the fuel elements so as to permit coolant flow through the fuel assembly 20.

The material selected for use in forming the frame member 24 should provide maximum structural strength consistent with low neutron absorption cross section. For example, stainless steel is suitable for this purpose.

A grid member or structure 42 is secured to and extended laterally across the can 30 for the purpose of providing lateral support for the fuel elements or rods 22. A plurality of grids 42 can be secured to the can 30 at various spacings along the length of the can 30 so as to provide the amount of lateral support desired.

Figure 2:
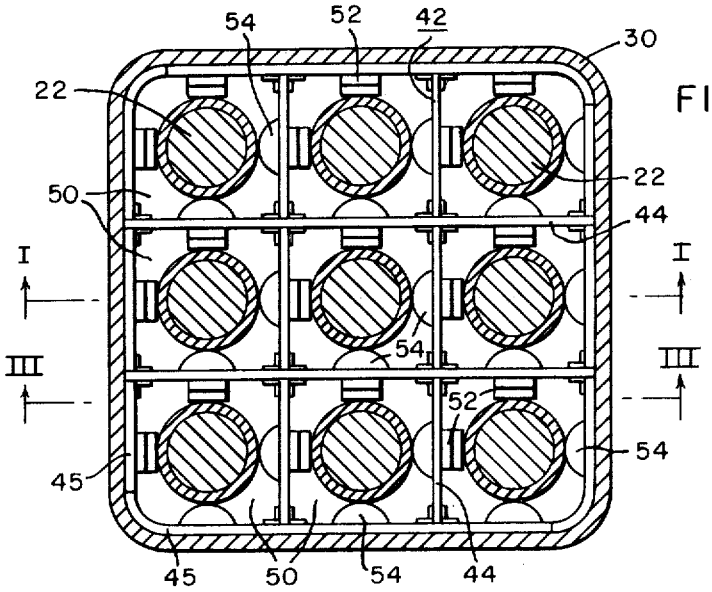
FIG. 2 is an enlarged cross sectional view of the fuel assembly of FIG. 1 and is taken along reference line II—II of FIG. 1 to show the support relationship between a grid member and the various fuel elements.
Figure 3:
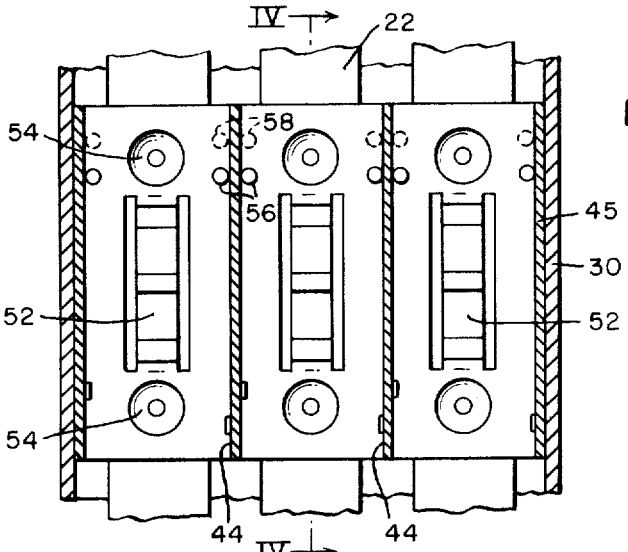
FIG. 3 is a longitudinally sectioned view of a fuel assembly and is taken along reference line III—III of FIG. 2 to show the rigid and resilient lateral supports in one of the grid straps.
Figure 4:
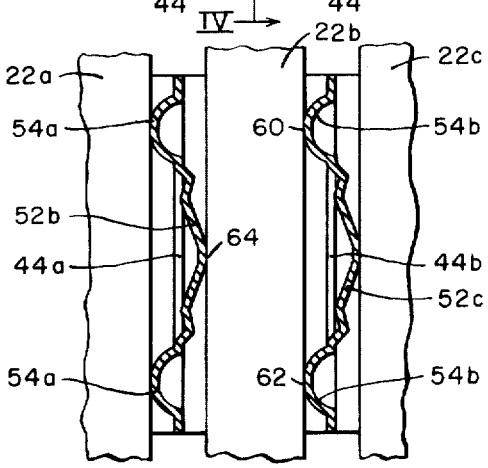
FIG. 4 is a longitudinally sectioned view of a portion of a grid strap and is taken along reference line IV—IV of FIG. 3 to show the support relationship between a grid strap and the various fuel elements.

As viewed in FIGS. 2, 3 and 4, the grid 42 is comprised of a plurality of inner straps 44 which are interwoven in a grid-like manner. Generally, this configuration is similar to that described in copending application Ser. No. 326,070, entitled "Fuel Arrangement for a Nuclear Reactor," filed Nov. 26, 1963, now abandoned by Erling Frisch, and also assigned to the present assignee, which is a continuation of copending application Ser. No. 19,851, entitled "Fuel Arrangement for a Nuclear Reactor," now abandoned, filed Apr. 4, 1960, by Erling Frisch and also assigned to the present assignee. Therefore, the specific description of the grid 42 will be limited here to the subject matter which pertains to the present invention. Thus, it is to be noted that the inner straps 44 are interfitted through the use of opposing latching means or slots (as indicated by the reference character 46 in FIG. 5) which allow the straps 44 to be interlatched at their various intersections.

In the formation of the grid 42, the latching means are employed with all of the inner straps 44 as well as the boundary straps 45. When the straps 44 and 45 are preassembled as described, the entire assembly is then permanently secured together, for example through the use of a furnace brazing operation or by welding. The grids 42 can be welded or otherwise secured to the can 30 so as to be supported suitably for performance of the lateral fuel rod supporting function. In turn, the grid or grids 42 also contribute to rigidizing the can 30.

The grid 42 is provided with respective openings 50 for [receipt of the fuel rods 22.] *In the example of FIG. 2, the grid 42 comprises a plurality of peripheral fuel element openings and one inner fuel element opening disposed inwardly of the peripheral fuel element openings. However, as evident from the Frisch patent application heretofore referred to, which has matured into Patent 3,379,618, more than one inner fuel element opening may be provided in the grid members 42.* Each inner strap 44 is provided with resilient means, such as spring fingers or strips 52, which are deflected from the strap 44 into an adjacent opening 50 for lateral support of the fuel rods 22.

Each inner strap 44 is also provided with rigid means, such as projections or dimples 54, which are located above and below each spring finger 52 and are deflected from the strap plane in a direction opposite to their respective spring fingers 52 so as to project into adjacent openings 50 for rigid lateral support of the fuel rods 22. FIG. 3 clearly shows a spring finger 52 with a dimple 54 both above and below the spring finger 52. FIG. 4, in turn, clearly shows that the spring finger 52 projects from the strap plane in a direction directly opposite to the dimples 54.

Referring to FIG. 2, the dimples 54 are shown as projecting into each opening 50 from the two adjacent inner straps 44. Spring fingers 52 can also be seen projecting into the same opening from the other two adjacent straps 44 which form the enclosure for the aforementioned opening. Therefore, each spring finger 52 engages the fuel rod 22 at a location opposite from a pair of dimples 54. Returning to FIG. 3 four guide dimples 56 and 58 are shown therein. The guide dimples 56 are aligned horizontally and project from the strap plane in one direction, while the guide dimples 58 are also aligned in a horizontal plane but project from the strap plane in the opposite direction from the dimples 56. The guide dimples 56 and 58 are tangent to the width of the slot 46 and are located vertically opposite to the slot 46. The guide dimples 56 and 58 serve to guide the straps 44 and 45 when the aforementioned straps are inserted into each other.

FIG. 4 shows how the fuel element 22 is laterally supported in one plane. Dimples 54b substantially rigidly support fuel rod 22b at points 60 and 62, while spring finger 52b resiliently supports the fuel rod 22b at point 64. Thus, the fuel rod 22b is supported at three points in one plane. An identical three-point lateral support is also provided in a plane perpendicular to the plane shown in FIG. 4. FIG. 4 also shows that the spring finger 52b engages one fuel rod 22b on one side of the strap 44a while the dimples 54a on the same strap 44a engage another fuel element 22a on the other side of the inner strap 44a. Also shown in FIG. 4 is the fact that the point 64 where spring finger 52b engages the fuel rod 22b is located approximately midway between the two points 60 and 62 where the two dimples 54b engage the fuel rod 22b.

Returning now to FIG. 2, only one type of lateral supporting means is required at the boundary straps 45, because openings 50 are only located on one side of the boundary straps 45. Therefore, only a pair of dimples 54 or a spring finger 52 project into a single opening 50. Therefore, the arrangement is such that a spring finger 52 on boundary straps 45 is located opposite to a pair of dimples 54 on the inner straps 44, or a pair of dimples 54 on bondary straps 45 are located opposite to a single spring finger 52 on inner straps 44.

Figure 5:
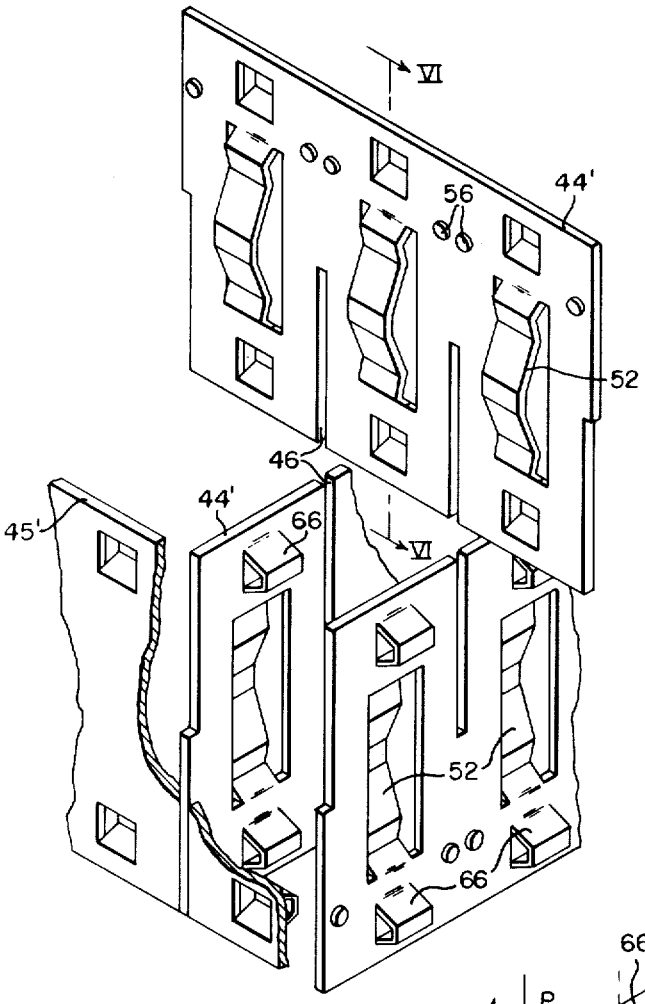
FIG. 5 is an isometric view of a plurality of grid straps with one strap being removed from the grid structure so as to show how the straps may be interlaced into a grid-like structure or "egg crate"
Figure 6:
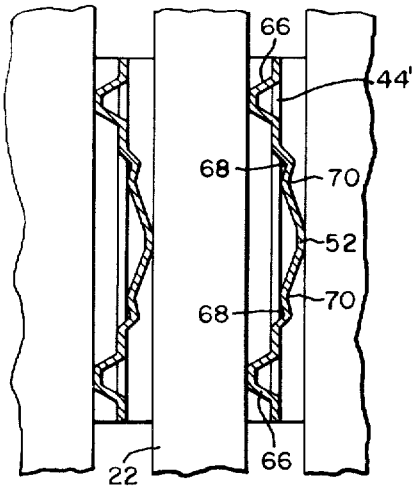
FIG. 6 is an enlarged longitudinally sectioned view of a grid strap of FIG. 5 and is taken along the reference line VI—VI of FIG. 5 to show another species of a rigid lateral support portion of the rigid and resilient combination used to support a fuel element.

All of the above features described in connection with the grid 42 are more readily discernible in the isometric view shown in FIG. 5. However, in FIGS. 5 and 6, another species of a substantially rigid lateral supporting means is shown. In this instance, the rigid lateral supporting means is a slotted projection 66 which is formed from a strap 44' and also 45'. Also shown in FIGS. 5 and 6 are several reverse curves 68 and 70 formed in the spring finger 52. The aforementioned curves have been formed in the spring finger 52 so as to cause the spring finger 52 to flex at its ends and also to obtain the desired spring properties.

Figure 7:
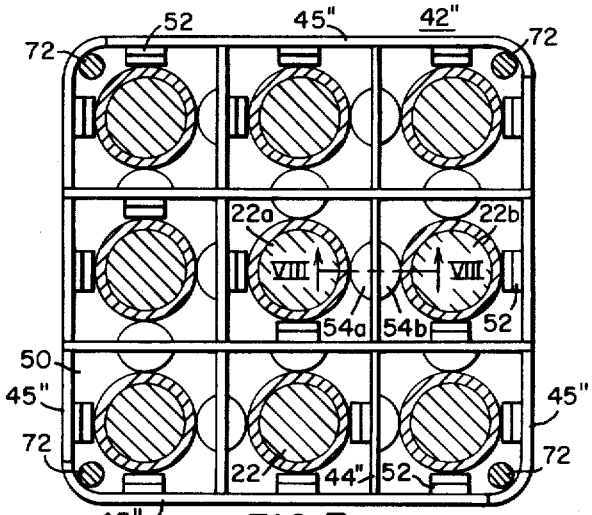
FIG. 7 is a cross sectional view of a fuel assembly taken just above the grid structure so as to show another arrangement of the rigid and resilent lateral supports wherein resilient lateral supports are located around the periphery of the grid structure.

Referring now to FIG. 7, there is shown a grid structure which contains only spring fingers 52 in the boundary straps 45''. The grid 42'', in this instance, is secured to four corner rods *or spacers* 72. The rods 72, in turn, are secured to upper and lower end plates 28 and 32, respectively, shown in FIG. 1. In this instance, the rods 72 replace the can 30 previously described in connection with FIG. 1.

In this type of a canless fuel assembly, it is advantageous to have only spring fingers 52 around the periphery, because if a boundary strap 45'' is bent during handling, there will still be resilence available from the spring finger 52. On the other hand, if a rigid lateral supporting means, such as slotted projections 66 or dimples 54, were located in the boundary straps 45'', inward bending of boundary straps 45'' would cause the laterally rigid supporting means to push the fuel rods 22 out of place.

Figure 8B:
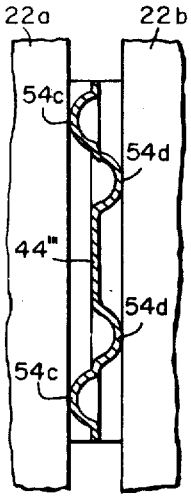
FIG. 8B is another embodiment of FIG. 8A, which serves the same purpose and can be used in lieu of the arrangement shown in FIG. 8A.
Figure 8A:
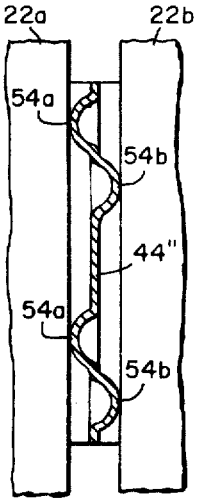
FIG. 8A is a longitudinally sectioned view of a portion of the grid structure of FIG. 7 and is taken along reference line VIII—VIII to show the combination of rigid lateral supporting means at certain locations in the grid structure so as to make it possible to have only resilient lateral supporting means around the periphery of the grid structure.

In the configuration shown in FIG. 7, a double set of dimples must be used at a single vertical location within certain adjacent grid openings 50. In FIG. 8A there is shown that dimples 54a protrude in one direction from the grid strap 44'' so as to engage fuel element 22a, and another pair of dimples 54b protrude in the opposite direction from the plane of the grid strap 44'' so as to engage fuel element 22b. FIG. 8B shows a different arrangement from FIG. 8A in that the two adjacent dimples 54d protrude in one direction, whereas the two outer dimples 54c protrude in the opposite direction.

Figure 14:
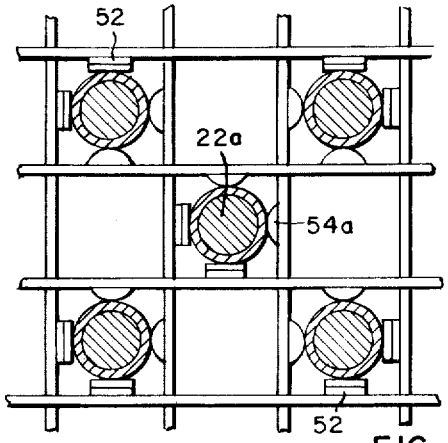
FIG. 14 is a view in elevation of a portion of a grid structure of this invention showing a different fuel element arrangement therein.

In FIG. 14, the grid arrangement is formed with resilient means 52 and rigid means 54a formed only in some of the grid openings with the fuel elements 22a extending through only predetermined ones of the openings.

Figure 9:
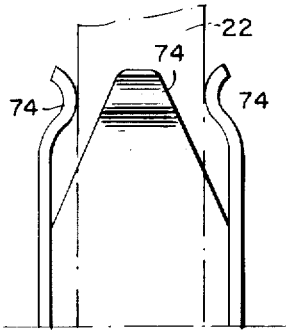
FIG. 9 is an elevational view of a portion of a grid structure showing an arrangement where only laterally resilient means are used to support a fuel element.
Figure 10:
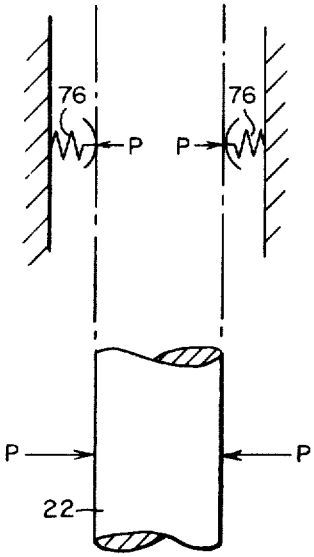
FIG. 10 is an equilibrium diagram with no externally applied forces acting on a fuel element in the grid arrangement of FIG. 9.

FIG. 9 shows a portion of a grid arrangement as described in the aforementioned copending application. In this configuration the fuel rod 22 is laterally supported by four cantilever spring tabs located 90° apart from one another in a horizontal plane. FIG. 10 represents an equilibrium diagram with the forces shown in a single plane, wherein symbol 76 represents the spring tab 74 acting on fuel element 22. The spring tab 74 also has a spring constant K. Therefore, FIG. 10 shows the static forces applied to fuel element 22.

Figure 11:
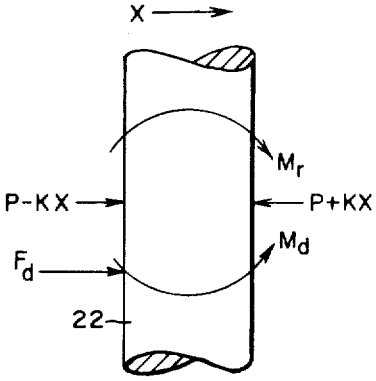
FIG. 11 is an equilibrium diagram with externally applied forces; tending to cause motion on a fuel element in the grid arrangement of FIG. 9.

FIG. 11 shows an equilibrium diagram resulting from a displacing force with motion of the fuel element 22 impending. FIGS. 9 to 11 represent an unstable spring and mass system and no resisting moment.

Figure 12:
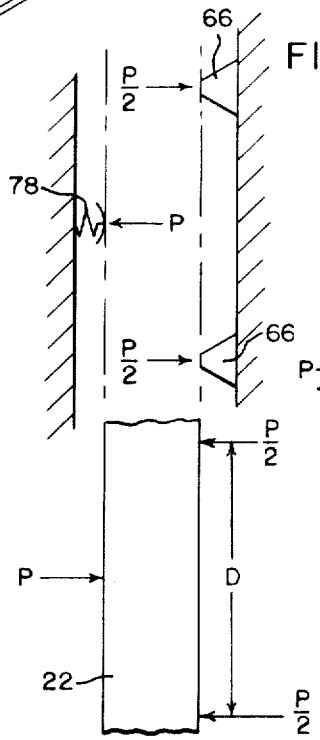
FIG. 12 is an equilibrium diagram with no externally applied forces acting on a fuel element in the grid arrangement of FIG. 6.
Figure 13:
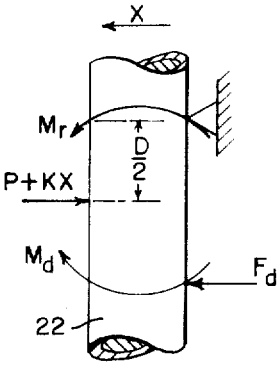
FIG. 13 is an equilibrium diagram with externally applied forces acting on a fuel element in the grid arrangement of FIG. 6.

FIGS. 6, 12 and 13, on the other hand, are the counterparts of FIGS. 9, 10 and 11, respectively; however, FIGS. 6, 12 and 13 represent the novel arrangement of this invention which utilizes a stable spring and mass system with a built-in beam effect.

A comparison will now be made between the novel arrangement shown in FIG. 6 in contrast to a prior arrangement as shown in FIG. 9. In FIGS. 10 to 13, the meaning of the symbols are as follows:

P=Preload on the fuel element 22 by the spring tab 74 or the spring finger 52
K=Spring constant
X=Amount of fuel element motion caused by a displacing force
$M_r$=Resisting moment to motion X
$M_d$=Displacing moment
$F_r$=Resisting force to motion X
$F_d$=Displacing force
D=Distance between the projections 66

Returning now to the old arrangement shown in FIGS. 9 to 11 and with the application of external forces producing lateral fuel element motion:

$F_r=(P+KX)-(P-KX=2KX$ (see FIG. 11)
$M_r=F_r$ (0) as no moment exists between the opposing forces P (see FIG. 10)
$M_r=0$
$M_d$ is greater than 0, because of the application of external forces Therefore, the old arrangement represents an unstable spring and mass system since motion must commence before a resisting force $F_r$ (neglecting friction) can be produced to react to the displacing force $F_d$. In addition, there is no resisting moment $M_r$ produced within a single grid structure 42 to counteract any displacing moment $M_d$.

Returning now to the novel arrangement shown in FIGS. 6, 12 and 13 and with the application of external forces producing lateral fuel element motion:

$F_r = P + KX$ (see FIG. 13)

$M_r = (P + KX)\frac{D}{2}$ as a moment arm exists between the point of rotation (see Fig. 13)

$M_r = F_r \frac{D}{2}$

The improvement in the new arrangement of FIG. 6 is readily ascertainable when the magnitude of the forces resisting motion are considered. Specifically, the force resisting fuel element displacement in the old arrangement of FIG. 9 is 2KX as compared with $P+KX$ in the new arrangement of FIG. 6. Furthermore, the resisting force in the old arrangement of FIG. 9 requires X motion (neglecting friction) before reaching equilibrium and offers no resisting moment. This is due to the fact that one cantilever spring tab was working against the other thereby providing a resisting force which became dependent upon the motion of the spring tabs 74. This vibratory motion, even though microscopic, may result in wear and fretting of the fuel element 22.

The new arrangement of FIG. 6, however, produces a resisting force equal to the preload P on the spring finger 52; and the new arrangement also produces an appreciable resisting moment, which first must be overcome before fuel element motion can occur. Therefore, this arrangement provides the capability of establishing the spring preload forces and the resulting resisting moment large enough in magnitude, in comparison with the mechanically and hydraulically induced displacing forces experienced in the operation of a reactor core, such that there will be no motion of the fuel elements 22 at the grids 42. Therefore, the new arrangement of FIG. 6 provides a more rigid support for the fuel elements 22 in the fuel assembly 20.

While there have been shown and described what are at present considered to be the preferred embodiments of the invention, modifications thereto will readily occur to those skilled in the art. For example, the cantilever spring tabs shown in FIG. 9 can be used to replace the spring fingers in the preferred embodiment. In fact, the only thing that is required is a resilient lateral supporting means of some type. Also a solid piece of material can be secured to the strap to provide a laterally rigid supporting means in lieu of the dimples or slotted projections. Another means for making the fuel assembly more rigid is to rotate the grid member laterally 90 to 180° from an adjacent grid member. The grid structure can also be made of a material such as Inconel or stainless steel.

It is not desired, therefore, that the invention be limited to the specific arrangements shown and described. However, it is intended to cover in the appended claims all such modifications as fall within the true spirit and scope of the invention.

We claim:

1. A grid structure for a nuclear reactor fuel assembly comprising a plurality of connecting members forming [respective openings] *peripheral and inner fuel element openings* through *each of which openings an* [which] elongated *fuel* [elements are] *elements is* adapted to extend, at least two rigid spaced projections extending into each of [at least some of] said *peripheral and inner* [grid] *fuel element* openings from at least one of said members, and at least one resilient means extending into each of said [some] *peripheral and inner* openings from at least another of said members and disposed generally opposite to said two rigid projections with its innermost protrusion being positioned in alignment with the region intermediate said spaced projections.

2. The combination of claim 1 wherein only one of said resilient means and said rigid means is located at the outer periphery of the grid structure.

3. The combination of claim 1 wherein said projections of each of said [some] openings are longitudinally aligned, and wherein at least some of the innermost protrusions are longitudinally positioned midway between the generally opposed rigid projections.

4. A grid structure for a nuclear reactor fuel assembly comprising a plurality of connecting members forming [at least one opening] *peripheral and inner fuel element openings* through *each of* which, *respectively*, at least one elongated *fuel* element extends and [forming] *forms* a segment of a flow channel [therebetween] *between said fuel elements*, rigid means engaging one side of *all of* said elongated [element] *elements, respectively*, to laterally position [said] *each* elongated element *yet permit longitudinal slippage thereof*, resilient means disposed on another side of [said] *each* elongated element generally opposite to said one side and engaging *respectively each* [said] elongated element to bias the latter into engagement with said rigid means, one of said rigid means and said resilient means extending from said connecting members into said *peripheral and inner openings* [opening,] and the other of said rigid means and said resilient means being located in said flow channel.

5. A grid structure for a nuclear reactor fuel assembly comprising a plurality of connecting members forming [at least one] longitudinally extending *peripheral and inner fuel element openings* [opening] through *each of* which *openings* at least one nuclear fuel element extends, said connecting members forming wall means surrounding [said] *each peripheral and inner fuel element* opening, a pair of rigid projections extending from a portion of said wall means into [said] *each peripheral and inner* opening for rigidly engaging [said] *each* fuel element, *respectively, yet permit individual longitudinal slippage thereof*, and resilient means positioned in [said] *each peripheral and inner* opening in opposed relationship with said projections and located to engage said fuel element to bias the latter into engagement with said rigid projections, *respectively*.

6. The combination of claim 5 wherein said pair of rigid projections are longitudinally aligned on said wall means portion and are longitudinally spaced from one another, and wherein said resilient means is positioned in alignment with the region intermediate said spaced projections.

7. The combination of claim 6 including another pair of longitudinally aligned spaced rigid projections extending from another wall means portion *into each opening, respectively*, said other wall means portion positioned laterally with respect to said first wall portion *of each opening*, and other resilient means positioned in [said] *each* opening in opposed relationship with said other pair of projections and positioned to engage said fuel element to bias the latter into engagement with said other pair of projections.

8. The combination of claim 5 wherein said resilient means are formed integrally with said wall means.

9. A grid structure for a nuclear reactor fuel assembly comprising a plurality of interlaced straps forming at least a pair of adjacent longitudinally extending openings with each of said openings having at least one elongated nuclear fuel element extending therethrough, at least a pair of longitudinally aligned spaced rigid projections extending from said straps into each of said openings for rigidly engaging the respective fuel element, resilient means extending from said straps into each of said openings in opposed relationship with said projections and positioned to engage said respective fuel element to bias the latter into engagement with the respective pair of rigid projections one of said straps forming a common wall between said adjacent openings, one of said pairs of spaced longitudinally aligned rigid projections being formed on said common wall and extending into one of said openings, and one of said resilient means being formed on said common wall and positioned intermediate and in longitudinal alignment with said oen pair of spaced projections, said one resilient means extending into the other of said openings.

10. A grid structure for a nuclear reactor fuel assembly comprising a plurality of interlaced straps forming at least a pair of adjacent longitudinally extending openings with each of said openings having at least one elongated nuclear fuel element extending therethrough, at least a pair of longitudinally aligned spaced rigid projections extending from said straps into each of said openings for rigidly engaging the respective fuel element, resilient means extending from said straps into each of said openings in opposed relationship with said projections and positioned to engage said respective fuel element to bias the latter into engagement with the respective pair of rigid projections, one of said straps forming a common wall between said adjacent openings, one of said pairs of spaced longitudinally aligned rigid projections being formed on said common wall and extending into one of said openings, and the other of said pairs of spaced longitudinally aligned rigid projections formed on said common wall and extending into the other of said openings, said one and said other pairs of rigid projections being longitudinally aligned with one another.

11. *A grid structure for a nuclear reactor fuel assembly comprising a plurality of connecting members forming at least one opening through which at least one elongated element extends and forming a segment of a flow channel therebetween, rigid means engaging one side of said elongated element to laterally position said elongated element, resilient means disposed on another side of said elongated element generally opposite to said one side and engaging said elongated element to bias the latter into engagement with said rigid means, one of said rigid means and said resilient means extending from said connecting members into said opening, and the other of said rigid means and said resilient means being located in said flow channel,* [The combination of claim 4 wherein] said connecting members [are] *being* formed from straps extending laterally of said fuel elements, and including latching means in said straps for interfitting said straps with each other, and guide means disposed on said straps longitudinally opposite to said latching means for guiding the straps into an interfitted relationship.

12. The combination of claim 11 wherein said latching means are a plurality of slots extending partially through said straps in a longitudinal direction, and wherein said guide means comprise a plurality of dimples grouped in pairs, and the dimples in each pair are laterally aligned with each other and are spaced from each other approximately the thickness of said strap.

13. A grid structure for a nuclear reactor fuel assembly comprising a plurality of connecting members formed from interfitting cross-laced straps with [at least a portion] *portions* of four of said straps forming [one] longitudinally extending *peripheral and inner* [opening] *fuel element openings* through *each of* which at least one nuclear fuel element extends, said connecting members forming wall means surrounding [said] *each peripheral and inner fuel element* opening, a pair of spaced longitudinally aligned rigid projections extending from one of said strap portions into [said] *each fuel element* opening for rigidly engaging said fuel element, first resilient means positioned in [said] *each fuel element* opening in opposed relationship with said projections and positioned in alignment with the region intermediate said projections to engage said fuel element to bias the latter into engagement with said rigid projections another pair of longitudinally aligned spaced rigid projections extending from another of said strap portions *into each fuel element opening,* said other strap portion positioned adjacent to said first strap portion, and second resilient means positioned in [said] *each fuel element* opening in opposed relationship with said other pair of projections and positioned in alignment with the region intermediate the projections of said other pair to engage [said] *each* fuel element *respectively* to bias the latter into engagement with said other pair of projections, and said first and said second resilient means being formed respectively on the remaining ones of said four strap portions.

14. A fuel arrangement for a nuclear reactor comprising a plurality of elongated fuel elements disposed in a generallyl parallel array, [at least one] *a plurality of longitudinally spaced grid* [member] *members* extending laterally across said fuel arrangement, *said array including fuel elements that are permitted to individually expand and contract longitudinally relative to said grid members, said grid members* [and] *positioning laterally in spaced relationship all of said fuel elements in said array that are permitted to individually expand and contract longitudinally relative to said grid members, each of said grid members* having respective openings *therein,* [through which] *all of* said *longitudinally expandable* fuel elements [extend] *in said array extending through respective openings in each grid member, each of* said grid [member] *members* having both resilient means and substantially rigid means extending into each of [at least some of] said *last mentioned openings for supporting all of* said *longitudinally expandable* fuel elements against lateral displacement, and said resilient means being disposed generally opposite to said rigid means.

15. [A fuel arrangement for a nuclear reactor comprising a plurality of elongated fuel elements disposed in a generally parallel array, at least one grid member forming respective openings through which said fuel elements extend, said grid member having resilient means and substantially rigid means resilient means and substantially extending into each of at least some of said openings for supporting said fuel elements against lateral displacement,] *The fuel arrangement of claim 14 wherein* said rigid means *includes* [including] respective spaced projections extending into each of said [some] grid openings but being located opposite said resilient means, and said resilient means engaging said fuel elements at a location between said projections.

16. The combination of claim 15 wherein said spaced projections are disposed in groups of at least two longitudinally aligned projections.

17. A fuel arrangement for a nuclear reactor comprising a plurality of elongated fuel elements disposed in a generally parallel array, elongated frame means juxtaposed and parallel to said fuel elements, [at least one] *a plurality of longitudinally spaced* grid [member] *members* being [secure] *secured* to and extending laterally [across] *from* said frame means [and] , *said array including fuel elements that are permitted to individually expand and contract longitudinally relative to said grid members, said grid members positioning laterally in spaced relationship all of said fuel elements that are permitted to individually expand and contract longitudinally and slip relative to said grid members, each of said grid members* forming respective *aligned* openings through at least some of which *aligned openings each of* said *expanding* fuel elements *respectively* extend, *there being a group of longitudinally aligned fuel element openings for each expanding fuel element,* said grid [member] *members* having resilient means and substantially rigid means extending into each of said fuel element openings for supporting *all of* said *expanding* fuel elements against lateral displacement, said resilient means including respective spring fingers engaging said *expanding* fuel elements, said rigid means including respective spaced projections extending into each of said fuel element openings in groups of at least two axially aligned projections but being located generally opposite of said spring fingers, said spring fingers engaging said fuel elements at a location between said spaced projections, and four of said projections and two of said spring fingers extending into each fuel element opening.

18. [A fuel arrangement for a nuclear reactor comprising a plurality of elongated fuel elements disposed in a generally parallel array, at least one grid member extending laterally across said fuel arrangement and having at least one opening through which at least one of said fuel elements extend, substantially rigid means for rigidly engaging and laterally positioning said one fuel element, resilient means for biasing said one fuel element into engagement with said rigid means, said resilient means being disposed generally opposite to said rigid means, and] *The fuel arrangement of claim 14 wherein* at least one of said rigid means and said resilient means *is* [being] disposed on *each of* said grid [member] *members* and *extend* [extending] into said [opening] *openings.*

19. A fuel arrangement for a nuclear reactor comprising [at least one] *a plurality of* elongated fuel [element] *elements disposed in a generally parallel array, means for positioning said fuel elements, said array including fuel elements that are permitted to individually expand and contract longitudinally relative to said positioning means, said means positioning laterally in spaced relationship all of said fuel elements that are permitted to individually expand and contract longitudinally and slip relative to said positioning means, said positioning means engaging each of said expanding fuel elements and including substantially* rigid means engaging one side of *each of* said *expanding* fuel [element] *elements* to laterally position said *expanding* fuel [element] *elements,* resilient means disposed on a side of *each of* said *expanding* fuel [element] *elements* generally opposite to said one side and engaging said *expanding* fuel [element] *elements respectively* to bias the latter into engagement with said rigid means, one of *each of* said resilient means and said rigid means being longitudinally spaced along said fuel [element] *elements respectively* to form a pair of spaced members, and the other of *each of* said resilient means and said rigid means being positioned intermediate said pair of members.

*20. The fuel arrangement of claim 19 including means for fixedly positioning each of said rigid and resilient means longitudinally with respect to each of said expanding fuel elements.*

*21. The fuel arrangement of claim 20 including means for fixedly positioning said rigid means laterally with respect to each of said expanding fuel elements.*

*22. A fuel arrangement for a nuclear reactor comprising a plurality of elongated fuel elements disposed in a generally parallel array, a plurality of longitudinally spaced grid members extending laterally across said fuel arrangement for positioning laterally in spaced relationship all of said fuel elements in said array that are permitted to individually expand longitudinally and slip relative to said grid members, said expanding fuel elements each of said grid members comprising a plurality of connecting members forming a plurality of fuel element openings, each of said expanding fuel elements extending through an opening in each grid member, and forming a segment of a flow channel between said fuel elements, substantially rigid means rigidly engaging one side of each of said expanding fuel elements respectively to laterally position each expanding fuel element yet permit longitudinal slippage thereof, resilient means disposed on another side of each expanding fuel element generally opposite to said one side and engaging respectively each expanding fuel element to bias the latter into engagement with said rigid means, one of said rigid means and said resilient means extending from said connecting members into said opening, and the other of said rigid means and said resilient means being located in said flow channel.*

*23. The fuel arrangement of claim 14 including rigid spacer means extending longitudinally between said grid members and fixedly secured thereto to space said grid members longitudinally with respect to said expanding fuel elements.*

*24. The fuel arrangement of claim 22 including rigid spacer means extending longitudinally between said grid members and fixedly secured thereto to space said grid members longitudinally with respect to said expanding fuel elements.*

*25. The fuel arrangement of claim 14 wherein said resilient means is preloaded with a force sufficient to overcome those displacement forces respectively acting on said expanding fuel elements and tending to move said fuel elements laterally away from said rigid means.*

*26. The fuel arrangement of claim 14 wherein said resilient means are formed integrally upon said grid members.*

*27. The fuel arrangement of claim 14 wherein each of said grid members is formed by a plurality of cross-laced interconnected rigid straps.*

*28. The fuel arrangement of claim 14 wherein said some fuel elements comprise at least a majority of said fuel elements in said fuel arrangement.*

*29. A fuel arrangement for a nuclear reactor comprising a plurality of fuel elements disposed in a generally parallel array, means for supporting said fuel elements for limited longitudinal movement to permit expansion and contraction of each movable fuel element relative to said supporting means and independently of expansion and contraction of the other longitudinally movable fuel elements, a plurality of grid members spaced apart longitudinally of said array and each extending laterally across said array for positioning laterally in spaced relationship all of said longitudinally movable fuel elements, rigid spacer means extending longitudinally of said array between said grid members and rigidly secured to all of said grid members to space said grid members longitudinally with respect to the fuel elements, each of said grid members comprising peripheral straps and two sets of intersecting and rigidly interconnected inner straps with said inner straps of one set extending transversely of said inner straps of the other set, said inner and peripheral straps cooperating to form a plurality of openings, respective openings in said grids being aligned longitudinally of said array to form groups of aligned fuel element openings respectively accommodating the longitudinally movable fuel elements passing therethrough, there being a group of longitudinally aligned fuel element openings for each longitudinally movable fuel element, each said inner strap including a plurality of pairs of rigid means formed integrally thereon, the rigid means of each pair being spaced from each other longitudinally of the array and the different pairs being spaced apart along each strap in a direction transversely of the array, each pair of said rigid means engaging one side of one of said longitudinally movable fuel elements to laterally position each such fuel element yet permit longitudinal slippage thereof, a plurality of spaced apart resilient springs formed integrally with each inner strap, each such resilient spring being formed longitudinally intermediate one pair of said rigid means and extending outwardly from said inner strap in a direction away from the latter pair of rigid means, the resilient springs being spaced along each inner strap in a direction transversely of the array and by a distance approximating the spacing between the pairs of rigid means formed along that inner strap, said resilient springs engaging another side of said longitudinally movable fuel elements generally opposite to said one side to bias each of said longitudinally movable fuel elements into engagement with one pair of said rigid means, there being at least one pair of rigid means and one spring extending into each fuel element opening for the longitudinally movable fuel elements.*

*30. The fuel arrangement of claim 29 wherein said resilient springs are preloaded with a force sufficient to overcome those displacement forces respectively acting on said longitudinally movable fuel elements and tending*

*to move said fuel elements laterally away from said rigid means.*

References Cited

The following references, cited by the Examiner, are of record in the patented file of this patent or the original patent.

UNITED STATES PATENTS

| | | | |
|---|---|---|---|
| 3,068,163 | 12/1962 | Currier et al. | 176—78 |
| 3,167,484 | 1/1965 | Beutel | 176—78 X |
| 3,228,854 | 1/1966 | Bekkering et al. | 176—78 |
| 3,255,090 | 6/1966 | Leirvik | 176—76 |
| 3,298,922 | 1/1967 | Prince et al. | 176—76 X |

| | | | |
|---|---|---|---|
| 3,301,764 | 1/1967 | Timbs et al. | 176—76 X |
| 3,301,765 | 1/1967 | Eyre et al. | 176—76 X |

FOREIGN PATENTS

| | | |
|---|---|---|
| 972,101 | 10/1964 | Great Britain. |
| 1,082,679 | 6/1960 | Germany. |
| 1,086,356 | 8/1960 | Germany. |
| 1,104,082 | 4/1961 | Germany. |

REUBEN EPSTEIN, Primary Examiner

U.S. Cl. X.R.

176—76